(12) United States Patent
Hoplock

(10) Patent No.: US 6,224,140 B1
(45) Date of Patent: May 1, 2001

(54) TONNEAU COVER

(75) Inventor: Burnie Hoplock, Manitoba (CA)

(73) Assignee: KBS Industries Ltd., Winnipeg (CA)

( * ) Notice: Subject to any disclaimer, the term of this patent is extended or adjusted under 35 U.S.C. 154(b) by 0 days.

(21) Appl. No.: 09/412,422

(22) Filed: Oct. 5, 1999

(51) Int. Cl.[7] .................................................. B60P 7/02
(52) U.S. Cl. .............................. 296/100.17; 296/100.01; 296/100.07; 296/100.18
(58) Field of Search ........................... 296/100.1, 100.17, 296/100.18, 159, 160, 100.07, 100.01

(56) References Cited

U.S. PATENT DOCUMENTS

| | | | | |
|---|---|---|---|---|
| 3,737,190 | * | 6/1973 | Smith et al. | 296/159 |
| 4,036,521 | * | 7/1977 | Clenet | 296/100 |
| 4,181,351 | * | 1/1980 | Spanke | 296/100.07 |
| 4,261,611 | * | 4/1981 | Barry et al. | 296/100.1 |
| 4,272,119 | * | 6/1981 | Adams | 296/100 |
| 5,110,021 | * | 5/1992 | Dawson, Jr. | 296/100.1 |
| 5,395,985 | * | 3/1995 | Robinson | 296/10 |
| 5,971,469 | * | 10/1999 | Lund et al. | 296/100.01 |

* cited by examiner

Primary Examiner—D. Glenn Dayoan
Assistant Examiner—Greg Blankenship
(74) Attorney, Agent, or Firm—Adrian D. Battison

(57) ABSTRACT

A tonneau cover is arranged to mount on the truck box of a conventional pick up truck for enclosing the box. The cover comprises a pair of panels which are pivotally mounted on respective sides of the box. The panels extend laterally inward such that free ends of the panels engage each other in a closed position. The panels may be pivoted upward and secured in an upward orientation by a pair of rails connected between the free ends of the respective panels in an extended position of the panels. The panels form a pair of side walls in the extended position for supporting large cargo in the box. The rails form a rack in the extended position for supporting additional cargo thereon. A locking device secures the panels in the closed position while a plurality of struts provide additional support to the panels when pivoting the panels between the closed and extended positions.

7 Claims, 6 Drawing Sheets

TONNEAU COVER

FIELD OF THE INVENTION

This invention relates to a tonneau cover for use with conventional pick up trucks having a truck box.

BACKGROUND

Conventional pick up trucks generally have a truck box on a rearward end for carrying cargo. The use of a tonneau cover which is secured to the truck box is common for enclosing the truck box and for preventing theft of the cargo while the vehicle is unattended.

SUMMARY

It is one object of the present invention to provide an improved tonneau cover.

According to the present invention there is provided a tonneau cover for a conventional pick up truck having a truck box, the cover comprising:

a pair of mounting elements being arranged to mount on respective sides of the truck box;

a pair of door panels pivotally mounted on the respective mounting elements, each panel extending inward from the corresponding mounting element to a free end such that the free ends of the panels engage each other in a closed position of the panels, each panel extending generally upward from the corresponding mounting element such that the free ends are spaced apart in an extended position of the panels; and at least one frame element mounted between the panels in the extended position such that the panels are supported in an upright orientation for containing cargo in the truck box.

Frame elements are used securely support the panels in an upright orientation for additional cargo space. The panels are lightweight members having rigid supports mounted thereon such that the cover forms a rigid structure in the extended position. The frame elements can be used as a rack for hauling additional cargo thereon. The panels form extensions to the side walls of the truck box for increasing the storage capacity of the truck box as desired. Cargo can thus be located on top of the frame elements or below and above the truck box. Long materials can be carried while the tail gate is properly closed.

Preferably, each frame element extends in a generally horizontal manner between the free ends of the panels in the extended position such that the frame elements define a rack for supporting additional cargo thereon.

Preferably there is provided a pair of frame elements, each extending between the panels, the frame elements being mounted adjacent respective forward and rearward ends of the panels.

In this arrangement of the frame element, each frame element is pivotally mounted at a first end on one of the panels and includes a coupling on a second end for selectively coupling the frame element to the other panel.

A latch may be provided for securing each frame element adjacent to the corresponding panel which pivotally mounts said frame element thereon for securing the frame element in the closed position.

Preferably a gusset is mounted on each end of the each frame elements such that each gusset mounts between the corresponding frame element and the corresponding panel in the extended position.

Preferably, at least one strut is mounted between each panel and the truck box, each strut being mounted at a first end on the panel at a position spaced from the corresponding side of the truck box and being mounted at a second end on the truck box.

The second end of each strut may be mounted adjacent to the corresponding side of truck box such that the strut extends generally upright along the corresponding panel in the extended position of the panels.

The second end of each strut may be mounted on the truck box at a position spaced from the corresponding side of truck box such that the strut extends at an upward incline towards the panel in the extended position of the panels for added structural support.

There may be a coupling mounted on the second end of each strut such that the second end of the strut may be selectively mounted at each or two positions on the truck box in relation to the respective sides of the truck box for varying the inclination of the strut when the panels are in the extended position. One of the positions is on the side wall away from the tail gate so as not to interfered with the opening of the tail gate and the other is on the tail gate to provide an increased mechanical advantage.

A flange is preferably mounted on the free end of one of the panels.

The flange extends outwardly from the bottom side of said panel defining a shoulder for supporting the free end of the other panel thereon in the closed position.

Each panel preferably includes a forward flange extending forwardly over the front end of the truck box and a rear flange extending rearwardly over the rear gate of the truck box.

The rear flange preferably includes a downwardly extending portion for partially engaging a rearward face of the rear gate such that the rear gate is secured in a closed and upright orientation when the panels are in the closed position.

Each panel preferably comprises a rectangular sheet supported on a frame of rigid members.

A first one of the panels preferably has a first locking member mounted thereon for securing the first panel to the truck box and a second one of the panels preferably has a second locking member mounted thereon for securing the second panel to the first panel.

The first locking member may comprise a pair of rods slidably mounted to extend from respective front and rear ends of the first panel and an actuator for selectively engaging the rods into the respective front and rear ends of the truck box for securing the first panel to the truck box.

The first locking member is preferably mounted on an inner side of the first panel such that the locking member is inaccessible from an outer side when the panels are in the closed position.

The second locking member may comprise an engaging member which is slidably mounted within the second panel and a keyed actuator mounted on an outer side of the second panel for selectively engaging the engaging member into the first panel for locking the second panel adjacent to the first panel in the closed position.

An extended cover may be connected between the free ends of the panels when the panels are positioned to extend laterally outward from the respective sides of the truck box for enclosing the truck box.

The extended cover preferably comprises a plurality of frame members mounted on the panels to form a domed structure and a membrane extending over the frame members such that the cover forms a tent like structure.

A more simple cover may simply extend across the top edges of the panels when in the raised position so as to form a simple tent construction for camping.

Preferably, a gutter is provided underneath the hinges connecting the panel to the respective mounting element which transmits rain or washing water along the gutter to one end for disposal. The gutter is preferably formed as one edge of the mounting element with a flexible seal on the edge of the gutter for engaging an edge of the panel to improve water tightness.

BRIEF DESCRIPTION OF THE DRAWINGS

In the accompanying drawings, which illustrate an exemplary embodiment of the present invention.

DETAILED DESCRIPTION

Figure 1:
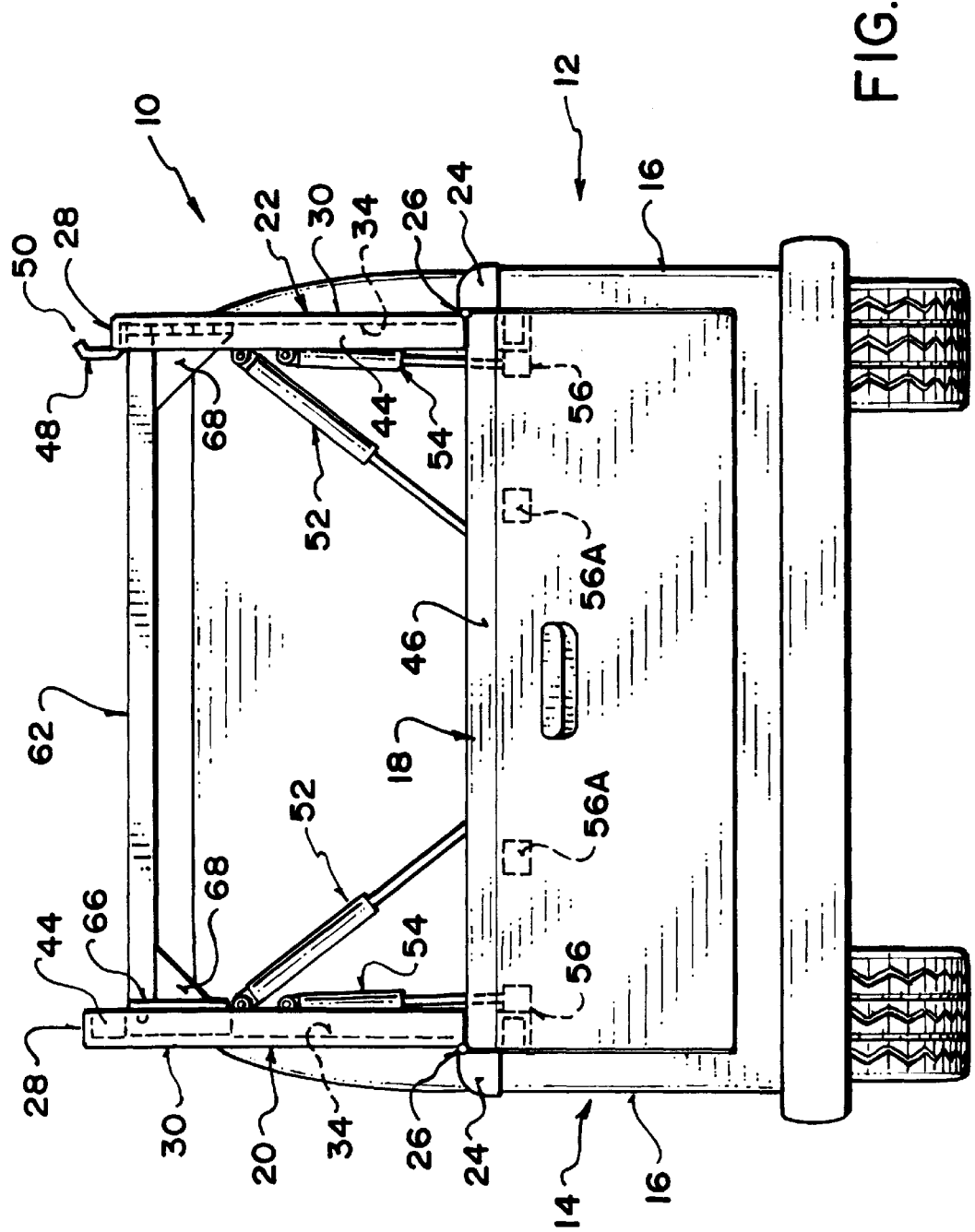
FIG. 1 is rear elevational view of a truck box with the tonneau cover mounted thereon in an extended position.

Referring to the accompanying drawings, there is illustrated a tonneau cover generally indicated by reference numeral 10. The tonneau cover 10 is for use with a conventional pick up truck 12 having a truck box 14 extending from a rearward end thereof. The truck box 14 includes a pair of sides 16 and a rear gate 18 arranged in the conventional manner.

The cover 10 includes a left panel 20 and a right panel 22, each mounted on a top end of the corresponding side 16 of the truck box. A cap 24 is mounted along the top end of each side 16 and includes a hinge 26 for pivotally mounting the corresponding panel 20, 22 thereon.

Figure 2:
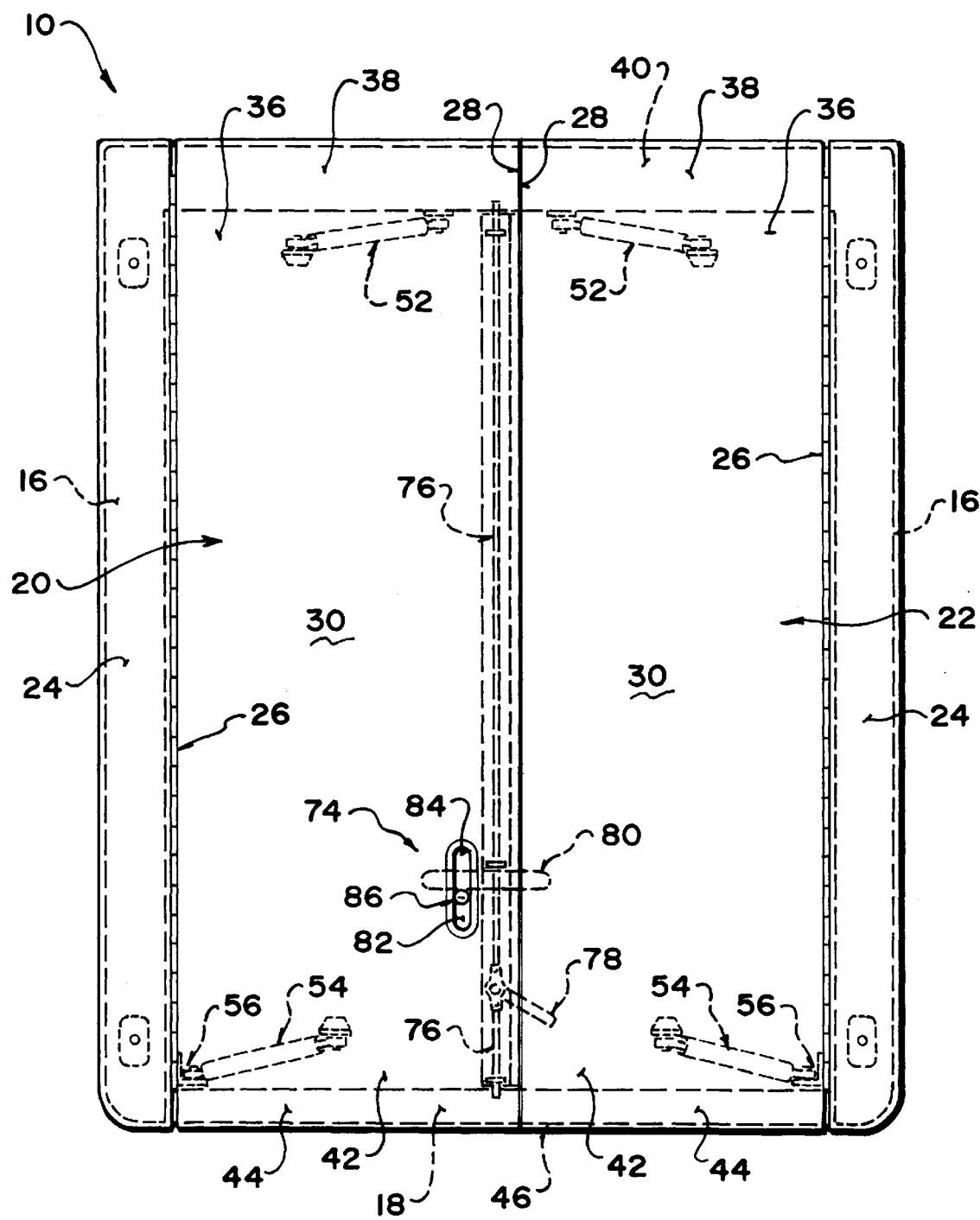
FIG. 2 is a top plan view of the tonneau cover in the closed position.

In a closed position as shown in FIG. 2, the panels 20, 22 extend horizontally inward to respective free ends 28 which are arranged to engage each other. In the closed position, an outer face 30 of the panels and the top sides of the caps are substantially flush with each other.

Each panel 20, 22 includes a fiberglass outer shell which forms the outer face 30 and a plurality of rigid supports 32 mounted on an inner face 34 of the panel for structural support. The rigid supports 32 extend in a V-shaped pattern across the inner face 34 with the apex being oriented towards the free end of the panel. The rigid supports 32 also extend in respective longitudinal and lateral directions across portions of the inner face 34. The arrangement of the stiffeners can be varied for different designs.

A forward end 36 of each panel 20, 22 includes forward flange portion 38 which is arranged to extend forwardly over a front side 40 of the truck box 14. Similarly, a rearward end 42 of each panel 20, 22 includes a rearward flange portion 44 which is arranged to extend rearwardly over the rear gate 18 of the truck box. The rearward flange portion 44 includes a downwardly turned end portion which is arranged to partially engage an outer face 46 of the rear gate 18 such that the rear gate is prevented from being opened when the panels are in the closed position.

The free end 28 of the right panel 22 includes a flange 48 extending outward adjacent the inner face 34 of the panel. The flange 48 includes an upturned end portion 50 such that the flange 48 forms a U-shaped channel which acts as a shoulder for supporting the free end 28 of the left panel 20 thereon in the closed position. The flange 48 collects water which seeps into the seam between the closed panels for weatherproofing the truck box when the panels are in the closed position.

The panels 20, 22 are upwardly pivotal from the closed position into an extended position as shown in FIG. 1 wherein the panels extend generally vertically upward from the respective sides of the truck box. Forward struts 52 and rearward struts 54 are mounted between the panels and the truck box to assist in supporting the panels as they are pivoted between the closed and extended positions. The struts are gas spring shocks which provide a spring assist and partially support the load of the panels in the extended position. They also act as additional tethers in case of failure of the frame members.

At the forward end of each panel, one of the forward struts 52 is mounted at a first end on the corresponding panel. A second end of each forward strut is mounted on the corresponding side of the truck box's front side 40. The forward struts 52 thus extend at an upward incline towards the respective panels in the extended position as shown in FIG. 1.

At the rearward end of each panel, one of the rearward struts 54 is mounted at a first end on the corresponding panel. A second end of each rearward strut 54 is mounted on the rear gate 18 of the truck box by a coupling 56, 56A which can be mounted at various locations at the rear gate.

As shown in FIG. 1, the couplings 56 are mounted on the side wall adjacent the tail gate of the truck box such that the struts 54 extend generally upward without interfering with the accessibility of the truck box over the rear gate when the panels are in the extended position. The couplings 56A are mounted on the tail gate thus interfering with the opening of the tailgate, but in this position the struts have a significantly increased mechanical advantage and can better resist inadvertent movement of the panels from the open position.

A forward rail 60 and a rearward rail 62 are mounted between the panels 20, 22 adjacent the free ends 28 of the panels. The rails 60, 62 are channel members having a U-shaped cross section providing lightweight structural support. The rails 60, 62 are mounted to extend parallel and spaced apart, generally horizontally between the panels in the extended position such that the rails form a rack for supporting additional cargo thereon. The rigid supports 32 mounted on the panels provide enough structural support to the panels that the panels are able to support a significant load on the rails.

Figure 3:
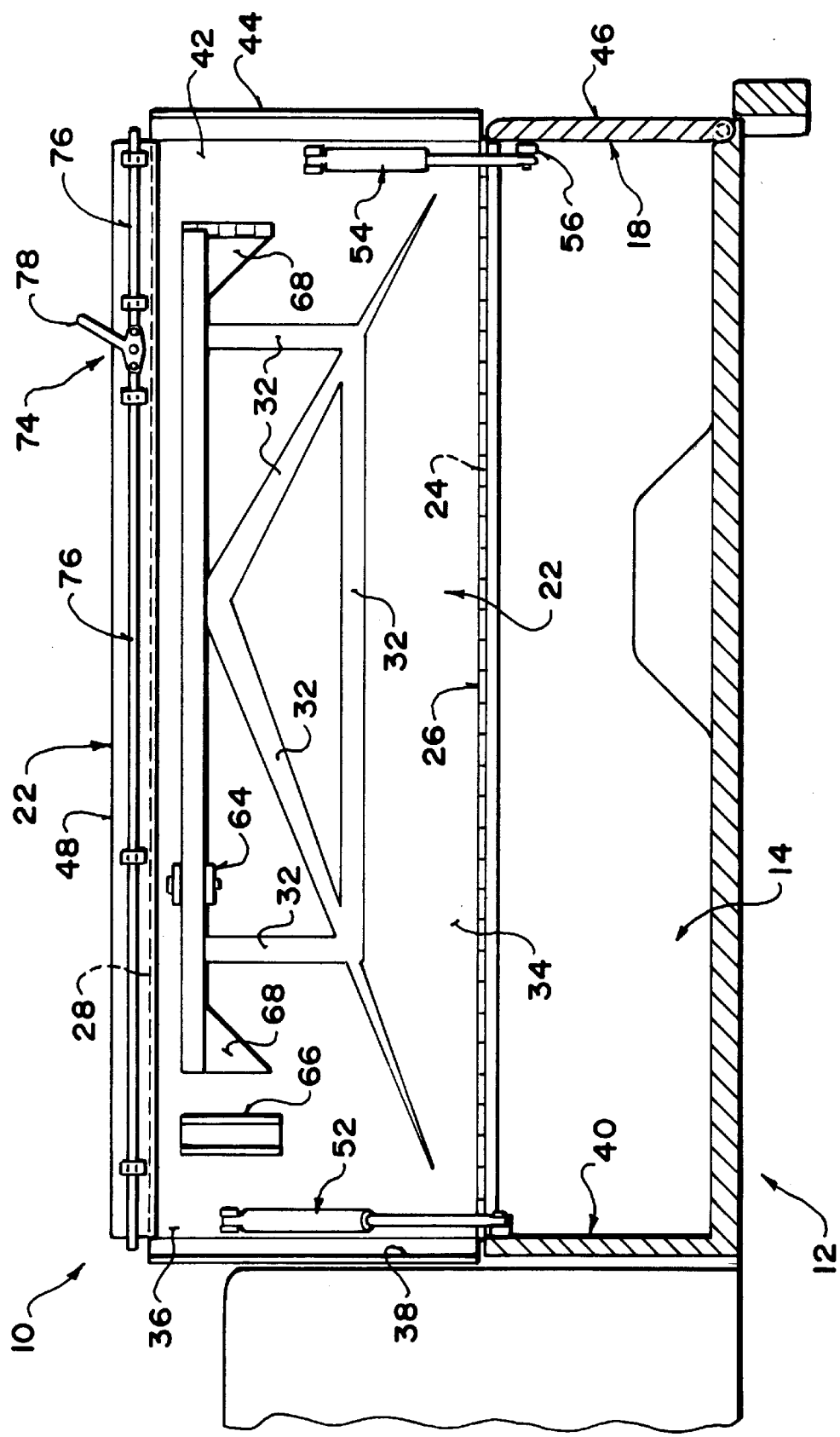
FIG. 3 is a side elevational view of an inner side of one of the panels of the tonneau cover in the extended position.
Figure 4:
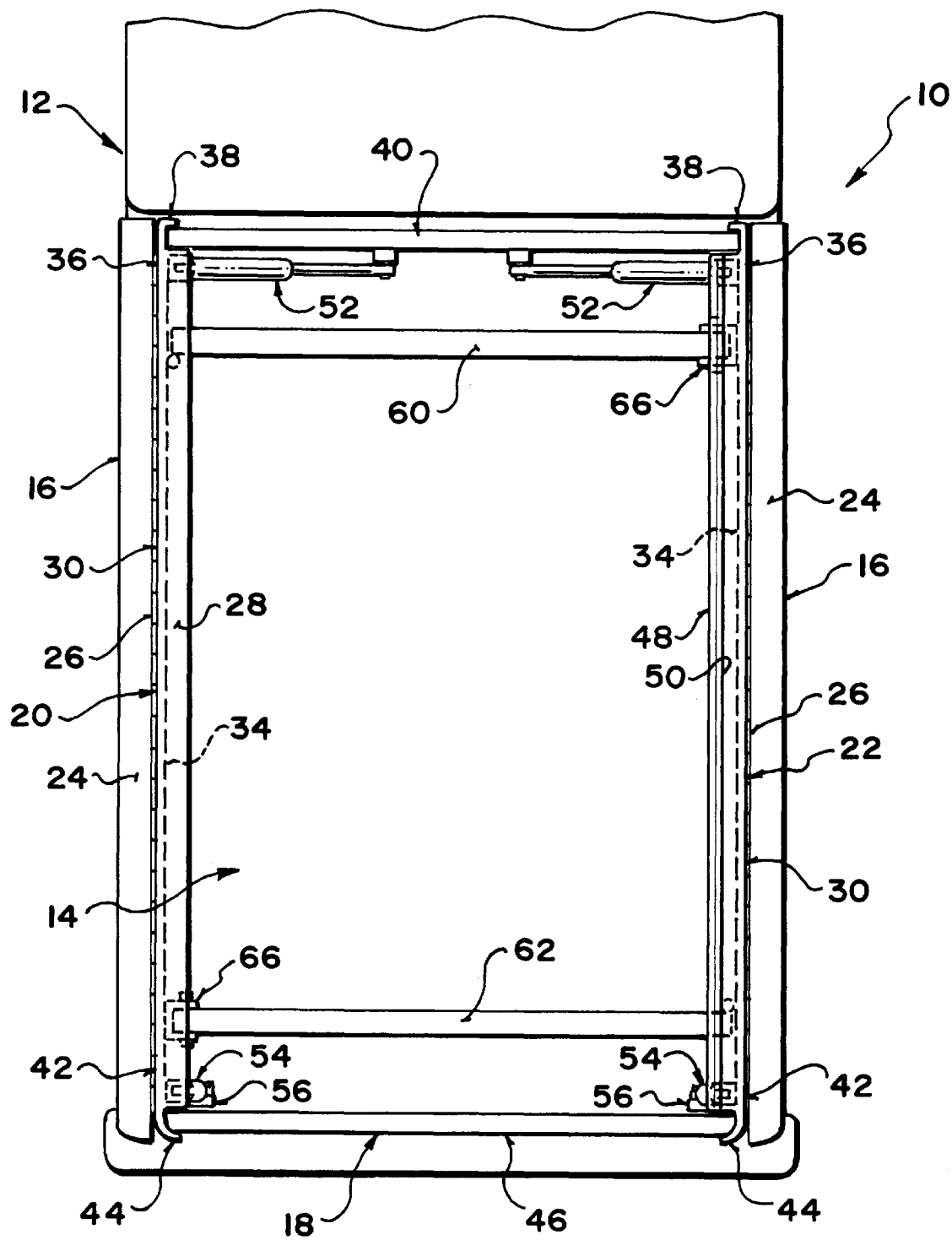
FIG. 4 is a top plan view of the tonneau cover in the extended position.

The forward rail 60 is pivotally mounted on the left panel 20 adjacent to forward end of the panel. The rail 60 is pivotal within a plane which is substantially perpendicular to the panel such that the rail may be positioned along the inner face of the panel in the closed position of the panels and secured to the inner face by a latch 64 similarly to the rearward rail 62 shown in FIG. 3. When the panel 20 is in the extended position, the forward rail 60 is pivoted outward and coupled to a bracket 66 mounted adjacent to the forward end on the right panel 22.

The rearward rail 62 is pivotally mounted on the right panel 22 adjacent the rearward end of the panel. The rail 62 is pivotal within a plane which is substantially perpendicular to the panel such that the rail may be positioned along the inner face of the panel for storage in the closed position. A latch 64 secures the rail 62 to the inner face of the panel. The rearward rail 62 is pivoted outward for coupling to a bracket 66 mounted adjacent to the rearward end on the left panel 20.

A gusset 68 is mounted on each end of each rail 60, 62 for added structural support between the panels and their respective ends of the rails in the extended position. The gussets 68 are pivoted with the respective rails such that the gussets are folded flat against the inner face of their respective panels in the closed position of the panels.

The rails can be formed in two pieces each attached to a respective panel and joining in the middle between the panels in a manner which provides sufficient bending resistance and which avoids rattling. More than two rails can be used at spaced positions along the panels for increased load support. The rails can be formed into a braced rigid frame if required for more strength.

A locking assembly 74 is mounted adjacent the free ends 28 of the panels 20, 22. The locking assembly 74 includes a pair of rods 76 which are slidably mounted longitudinally along the inner face of the right panel 22 adjacent to the free end 28. The rods 76 are arranged to extend from the respective forward and rearward ends of the right panel for engaging into respective apertures in the front side of the box and the rear gate respectively. A lever 78 mounted on the inner face of the right panel 22 includes camming faces connected to inner ends of the rods 76 for selectively sliding the rods outwardly or inwardly from the respective ends of the panel.

The right panel 22 is locked by positioning it in the closed position with the rods 76 being retracted. Actuating the lever 78 will extend the rods 76 outwardly into the respective apertures in the truck box. The rods 76 and the lever 78 are all mounted on the inner face of the right panel such that they are inaccessible to tampering by unwanted persons when the left panel is also locked in the closed position.

The left panel 20 includes a locking member 80 which is slidably mounted to selectively engage the right panel 22. Sliding movement of the locking member 80 is actuated by a handle 82 which is mounted on the outer face of the left panel. The handle 82 is received within a recess 84 in the outer face of the left panel and is restricted from use by unauthorised persons by a key slot 86.

Additional locking effect of the left hand panel can be provided by a rod fastening system similar to that of the right panel or by providing additional fasteners to the right panel adjacent the front end of the panels. Where commercially available slam fasteners are used, these can be opened by a single handle and cables from the rear end.

In order to lock the panels in the closed position, the right panel is first lowered and secured to the truck box by the rods 76 which are actuated by the lever 78. The left panel is then lowered and secured to the right panel by engaging the locking member 80 into the right panel, the locking member being actuated by the handle 82. Unlocking the panels thus requires keyed access to the handle 82 before either panel can be raised into the extended position.

Figure 5:
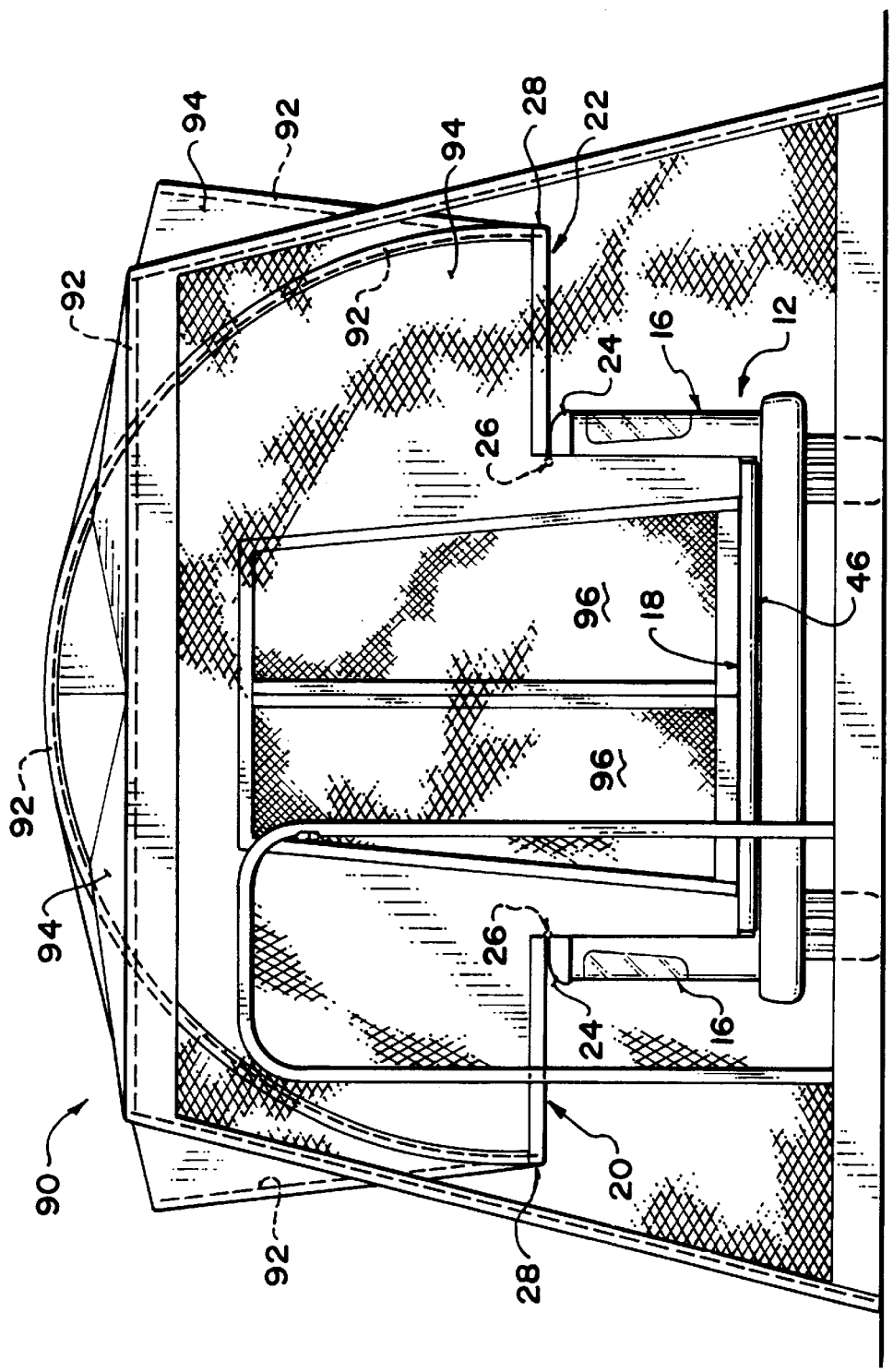
FIG. 5 is a rear elevational view of the tonneau cover in an outwardly extended position with a tent mounted thereon.

In a further arrangement as shown in FIG. 5, an additional enclosure 90 may be mounted on the panels to form a tentlike structure. The panels 20, 22 are pivoted to extend laterally outward from the respective sides of the truck box in an outwardly extended position. The panels include support members supporting the free ends of the panels spaced above the ground. The enclosure 90 includes a plurality of support rods 92 mounted between the free ends of the panels to form a dome structure similar to those used in conventional tents. A sheet 94 of canvas or nylon type material used in conventional tents is fitted over the dome structure of support rods 92 to form the enclosure. A door flap 96 is formed in the sheet 94. An extension of mesh like material is formed into an enclosure in front of the door flap 96 and extends down to the ground.

A more simple tent construction can be provided which simply bridges the upper edges of the panels in the open position above the rails. Front and rear depending walls can close off the truck box allowing the full truck box to be enclosed for storage of equipment in a dry area or for camping. In this condition with the tent structure attached, the vehicle can be driven in a normal manner provided the tent structure is attached using conventional systems in a sufficiently strong manner to avoid flapping or separation of the fasteners.

In a further alternative arrangement, rigid top panels can be attached at the upper edge of the two panels which are hinged by piano hinges so that they can fold down to lie flat against the inside of the panels but can be hinged upwardly to meet in the middle to form a roof structure. Preferably this arrangement retains the cross frames or rails 62 but in some cases these can be omitted so that the pivotal elements forming the roof structure define the necessary interconnection.

The panels have sufficient strength so that they can receive a significant load when in the closed position. Use of a fibreglass structure with the stiffening elements on the inside together with the overlapping arrangements provide sufficient strength to receive a significant load.

Figure 6:
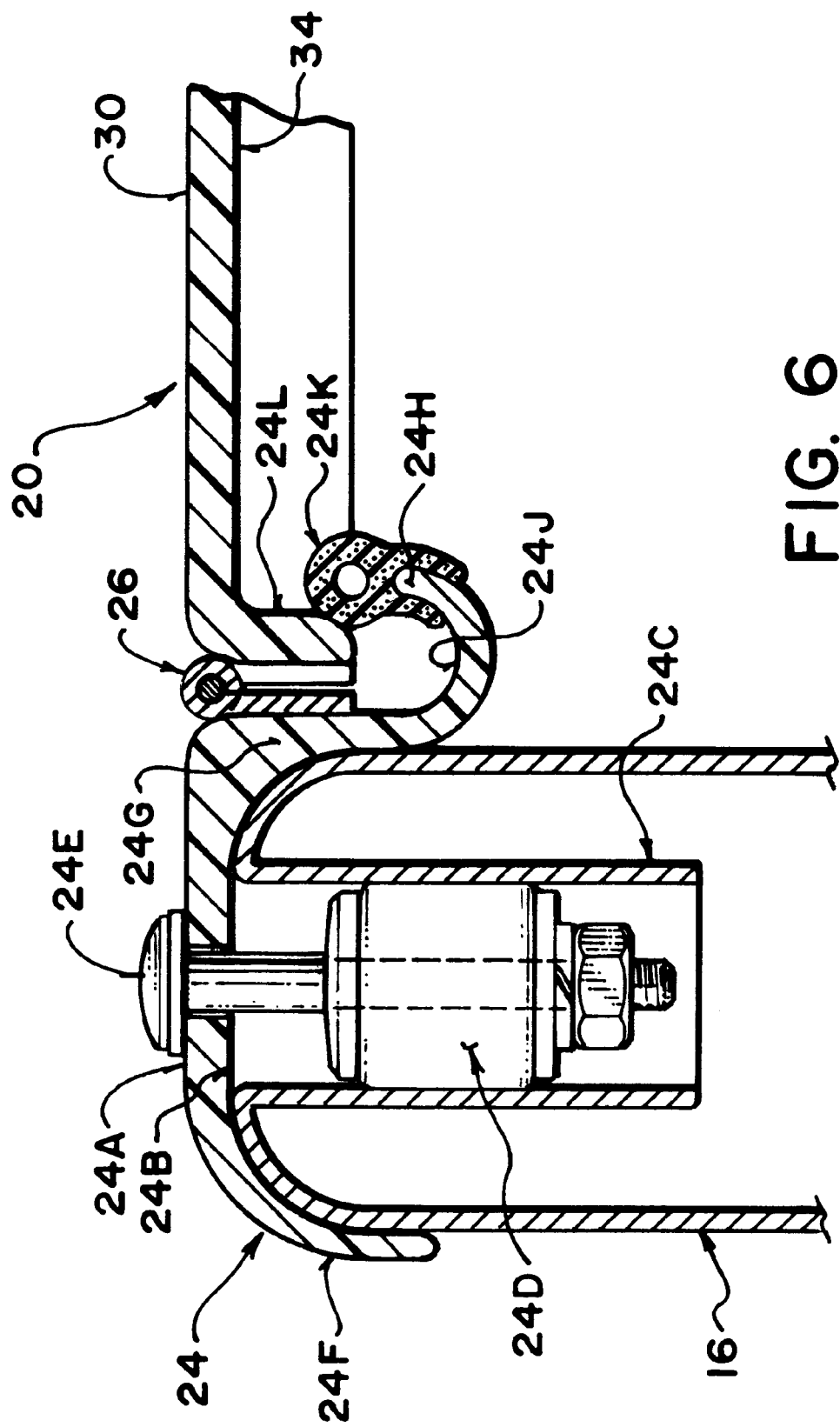
FIG. 6 is a cross-sectional view through the edge of one panel and its associated mounting element on an enlarged scale showing the seal and gutter arrangement.

Turning now to FIG. 6, there is shown more detail of the mounting element 24 and the panel 20 at the hinge 26. The mounting element 24 comprises a horizontal portion 24A which sits on top of the top surface 24B of the side of the truck box. The horizontal top portion 24A is attached to a stake pocket 24C by a suitable toggle arrangement 24D of a conventional nature which is bolted in place by a bolt 24E passing through the top wall 24A and into the stake pocket.

At the outer side edge, the mounting element 24 includes a downturned curved edge portion 24F which engages around the outside surface of the side wall in a smooth curved fit.

On the inside surface the mounting element includes an inner portion 24G which extends downwardly and then curves across the truck box and then upwardly into a lip 24H so as to form a gutter 24J. Thus any water passing through the area of the hinge 26 engages into the gutter and can flow to one end of the gutter for discharge through a suitable discharge arrangement.

On the edge of the lip 24H is provided a seal member 24K which includes a slot which engages onto the edge of the lip together with a flexible tubular seal element. This element abutts a lip 24L of the panel to provide a seal to prevent water from passing upwardly and inwardly over the lip 24H into the truck box.

While one embodiment of the present invention has been described in the foregoing disclosure, it is to be understood that other embodiments are possible within the scope of the invention. The invention is to be considered limited solely by the scope of the appended claims.

What is claimed is:

1. A pick up truck comprising:

a truck box with a bed, a front and wall and two vertical side walls standing upwardly from the bed, and a rear tail gate pivotal from a raised position extending across the side walls to a horizontal lowered position;

and a cover for the truck box comprising:

a pair of mounting rails each mounted on a top surface of a respective side wall of the truck box;

a pair of panels each pivotally mounted on a respective one of the mounting rails for pivotal movement between a closed position and a raised open position;

each panel in the closed position extending inward from the corresponding mounting rail to a free end such that the free ends of the panels engage each other in the closed position of the panels;

each panel in the raised open position extending generally upward from the corresponding mounting element such that the free ends are spaced apart;

two frame elements each mounted between the panels in the raised open position such that the panels are supported in an upright orientation for containing cargo in the truck box, the frame elements being mounted adjacent respective forward and rearward ends of the panels;

each mounting rail including a horizontal portion lying on the top surface of the respective side wall, an inner portion for depending along an inner surface of the respective side wall and a gutter portion including an upturned lip;

each panel having an outer downturned lip arranged adjacent the inner portion of the respective mounting rail;

each mounting rail including a hinge arranged between the outer edge of a respective panel and the inner portion of the respective mounting rail;

each mounting rail including a sealing member arranged between the outer edge of the respective panel and the respective rail member for preventing ingress of moisture therebetween such that moisture passing through the hinge is collected in the gutter portion.

2. The pick up truck according to claim 1 wherein the sealing member of each mounting rail is mounted on the upturned lip for engaging the downturned lip of the respective panel.

3. The pick up truck according to claim 1 wherein each mounting rail includes a downturned outer flange overlying an outer side of the respective side wall.

4. The pick up truck according to claim 1 wherein each frame element includes a horizontal rail reinforced by a gusset rigidly connected to the horizontal rail and extending from the rail to the corresponding panel in the raised open position.

5. The pick up truck according to claim 1 wherein each panel includes a forward flange portion extending forwardly and downwardly over a top of the front end wall of the truck box and a rear flange portion extending rearwardly and downwardly over a top of the tail gate of the truck box for engaging a rear face of the tail gate such that the tail gate is secured in the raised position when the panels are in the closed position.

6. The pick up truck according to claim 5 wherein each mounting rail includes a downturned outer flange overlying an outer side of the respective side wall.

7. The pick up truck according to claim 1 wherein each mounting rail is connected to the respective side wall by a plurality of toggle members each engaged into a respective stake pocket in the side wall.

* * * * *